UNITED STATES PATENT OFFICE.

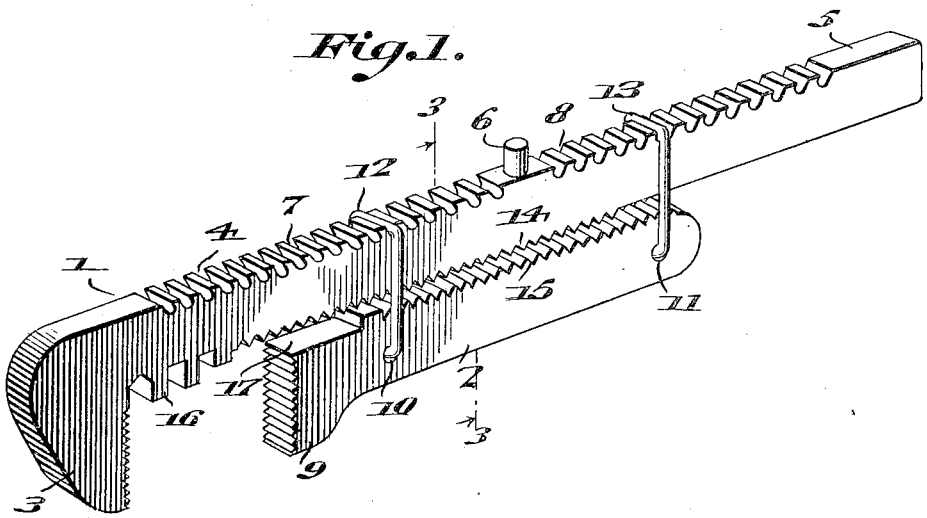
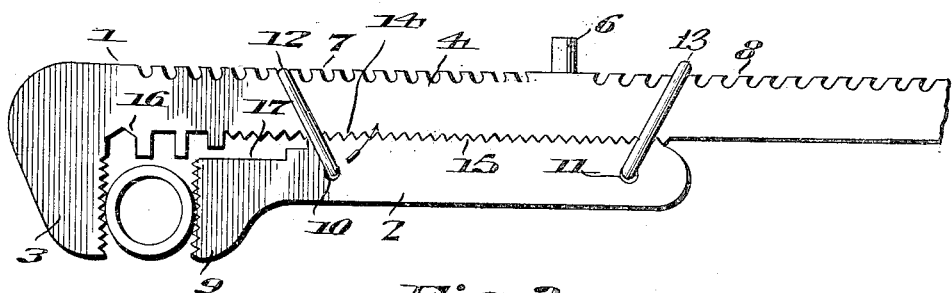
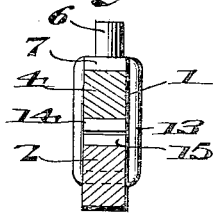

JOSEPH C. SKALICKY, OF WILLOW, OKLAHOMA.

WRENCH.

1,131,567.   Specification of Letters Patent.   Patented Mar. 9, 1915.

Application filed November 12, 1913. Serial No. 800,577.

*To all whom it may concern:*

Be it known that I, JOSEPH C. SKALICKY, a citizen of the United States, residing at Willow, in the county of Greer and State of Oklahoma, have invented new and useful Improvements in Wrenches, of which the following is a specification.

The present invention relates to improvements in wrenches, and resides in the novel construction, combination and operative arrangement of parts set forth in the following specification and falling within the scope of the appended claim.

In the drawing: Figure 1 is a perspective view of a wrench constructed in accordance with the present invention, the movable jaw being illustrated suspended from the shank of the stationary jaw in an inaccurate position, Fig. 2 is a side elevation illustrating the jaws engaging with an article, and Fig. 3 is a transverse sectional view on the line 2—2 of Fig. 1.

In carrying out my invention I provide a stationary member 1 and a movable member 2 which is adapted to be suspended from the said stationary member. The stationary member includes a head 3 and a longitudinally extending shank 4, the terminal of the shank providing the handle 5 of the wrench. The upper longitudinal edge of the shank 4 is provided, at a suitable distance from its head 3 and handle 5 with an upstanding portion or lug 6, the same serving as a stop for limiting the outward travel of the movable member 2, or the travel of the said member in the direction of the handle 5. The shank 4, is provided upon its outer edge with transversely arranged depressions or grooves 7 and 8 respectively, the grooves 7 being disposed forward or toward the head 3 of the member 1, and have their opposite walls beveled outwardly, while the grooves 8 have their opposite walls beveled or inclined in an opposite direction from those of the groove 7, the inclined walls of the grooves being inclined toward the handle 5. The movable element 2 comprises an elongated cross sectionally rectangular member which has its end, adjacent the head 3, toothed in an opposite direction to the teeth provided upon the engaging face of the head 3, and so providing this end of the member 2 with what may be termed head or jaw 9. The shank of the member 2 adjacent its head and its opposite and free end is formed with transverse openings 10 and 11 respectively, and the said openings are adapted to receive substantially U-shaped front and rear links 12 and 13 respectively, the said links straddling or surrounding the shank 4 of the stationary member 1, and the link 12 is adapted to be received within the grooves 7, while the link 13 engages within the grooves 8 of the said shank 4. The stop 6 is adapted to serve as a contact member for the link 12, to prevent the movable member 2 from being entirely removed from the member 1. The inner face edge of the shank 4 is provided with teeth 14 which are adapted to co-act with teeth 15 provided upon the shank of the movable member 2. The links 12 and 13, when the device is in an inoperative position, and as illustrated in Fig. 1 of the drawings, are of proper size to suspend the member 2 upon the member 1 without forcing its teeth 15 into engagement with the teeth 14 of the said member 1.

When adjusting the jaws for gripping an article the front link 12 is seated in a groove and the movable member swings rearwardly in an arc of a circle until the teeth thereon registers with the recesses between the teeth on the shank 4, the distance between the jaws then coinciding with the diameter of the article.

The edges of the members 1 and 2 provided with the teeth 14 and 15 may, if desired, be cut to form the same with a plurality of co-acting stepped portions 16 and 17 respectively, the said stepped portions varying so as to provide additional gripping jaws or surfaces for the wrench.

From the above description, taken in connection with the accompanying drawing, the simplicity of the device as well as the advantages thereof will, it is thought, be perfectly apparent to those skilled in the art to which such inventions appertain without further detailed description.

Having thus described the invention, what I claim is:

In a wrench, a head having an angular shank, the outer edge of the said shank having a stop, said outer edge having a plurality of spaced grooves which are arranged to the opposite sides of the stop and the outer walls provided by the grooves being inclined in the direction of the stop, the opposite edge of the shank having spaced teeth, a movable jaw member provided with a shank having teeth, links connected with the shank of the movable member and straddling the shank of the first mentioned member and adapted to be received within the transverse grooves of the said member to the opposite sides of the stop, and the said links being of a length to support the movable member and retain the same out of engagement with the shank of the movable member when disposed at a substantially right angle to the said shank, and to force the teeth of the movable member into engagement with the teeth of the shank and disposed angularly of the said shank.

In testimony whereof I affix my signature in presence of two witnesses.

JOSEPH C. SKALICKY.

Witnesses:
W. L. FAULKNER,
PRINCE KINSEY.

Copies of this patent may be obtained for five cents each, by addressing the "Commissioner of Patents, Washington, D. C."